Figure 1:
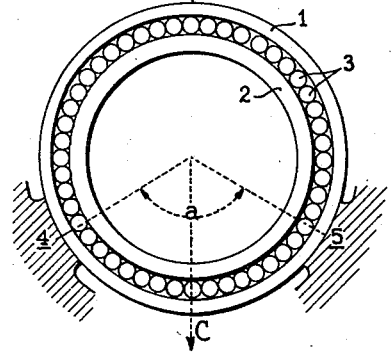

Nov. 21, 1961 A. PITNER 3,009,748
ACCURATELY CENTERED ANTI-FRICTION BEARING ASSEMBLY
Filed July 6, 1959 3 Sheets-Sheet 1

Nov. 21, 1961  A. PITNER  3,009,748
ACCURATELY CENTERED ANTI-FRICTION BEARING ASSEMBLY
Filed July 6, 1959  3 Sheets-Sheet 2
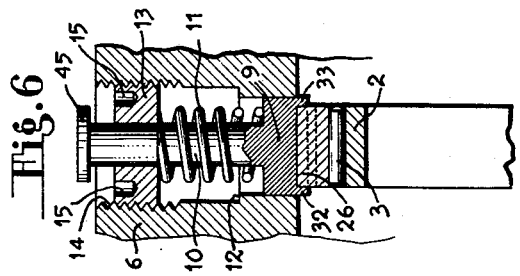

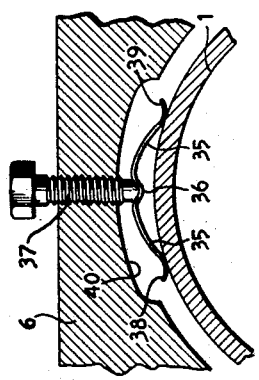
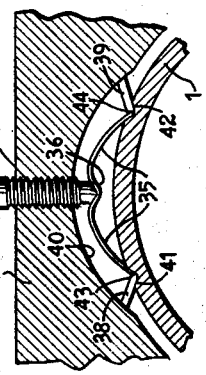
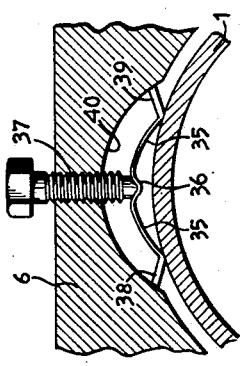
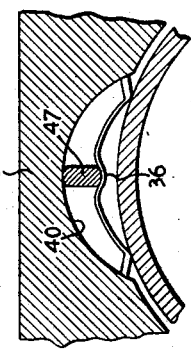
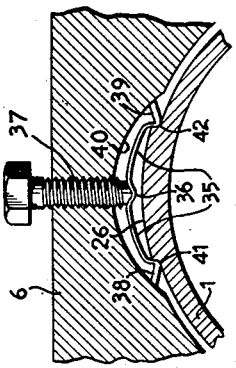
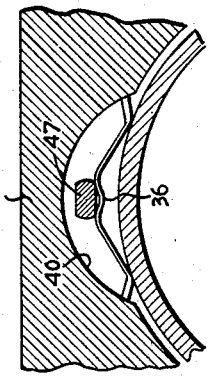

United States Patent Office 3,009,748
Patented Nov. 21, 1961

3,009,748
ACCURATELY CENTERED ANTI-FRICTION
BEARING ASSEMBLY
Alfred Pitner, Paris, France, assignor of one-half to Societe Anonyme des Roulements a Aiguilles, Rueil-Malmaison, France, a corporation of France
Filed July 6, 1959, Ser. No. 825,290
Claims priority, application France July 24, 1958
18 Claims. (Cl. 308—207)

The invention relates to anti-friction bearings comprising spherical, conical or cylindrical rolling elements disposed between two raceways, and more particularly to needle bearings.

The object of the invention is to provide an anti-friction bearing permitting an extremely accurate centering of a rotary shaft in a bearing block without subjecting the centering elements to excessive stress.

The extremely accurate centering of a shaft (for example a machine tool spindle) requires the radial play or clearance to be eliminated, if not over the entire periphery, at least at one or more judiciously chosen points of the latter, bearing in mind the direction of the load if this direction is invariable or the extent of the sector within which this load direction is capable of varying.

The solutions adopted heretofore have consisted in either generally pre-stressing the rolling elements, for example by a concentric expansion of the inner ring or race of the bearing, or locally decreasing the radial play by providing on either one of the raceways protrusions which create in their region a pinching effect, that is, a local reduction, and even elimination, of the radial play. In these known non-circular raceway devices, precautions are taken to prevent the raceway from elastically resuming a circular shape (the elimination or the reduction of the protrusion extent of the protrusions causing the play to be eliminated or limited to a maximum to re-appear) by disposing opposite said protrusions rigid or elastically yieldable support points which oppose this return to concentricity of the raceway.

The solution consisting in the general pre-stressing or the rigid support has in certain applications the disadvantage that the stresses could increase in an uncontrollable and dangerous manner, for example in the event of an uneven temperature increase in the inner and outer races owing to an increase in the load or in the rotational speed for example, or an outside supply of heat.

The solution consisting in the elastically yieldable support, if the latter is sufficiently yieldable to limit the stress, is not satisfactory, since it does not permit obtaining a truly accurate centering of the shaft when the load has varied in intensity or direction, or when transverse forces of inertia or vibrations occur.

The invention permits remedying these difficulties by combining the solution of a rigid support and that of an elastically yieldable support in such manner that, taking into account the main direction of the load, the exterior elastic forces maintain the shape determined by the constructor substantially constant. The reactions of the rigid supports, and consequently the stresses, could therefore be maintained constant or at least always distinctly less than those which would be liable to cause the destruction of the parts of the bearing in contact. In other words, there is obtained a constant support of a shaft on the rigid supports and a calibrated pre-stressing of the elements which is chosen in such manner that it balances the maximum component of the normal or accidental opposing forces due, for example, to the load or vibrations or forces of inertia.

In the construction which first comes to mind, the invention consists in disposing a conventional bearing within a box having two inner projections adapted to perform the function of rigid support zones for the outer race of the bearing, and an elastically yieldable pressure-applying means bearing on a third part of the outer race, the elastic force exerted by the pressure-applying means being sufficient to deform the outer race and thereby eliminate the radial play or clearance in the region of the two rigid support zones and of the pressure-applying means, and even subject the rolling elements to a pre-stressing of pre-determined intensity, the position of the rigid support zones being such that the direction of the load lie (and remain if it is variable) within the angle subtended by these rigid support zones or deviate therefrom but very slightly, the elastic force of the pressure-applying means being exerted in the direction or nearly in the direction of the load.

It will be realized that owing to this arrangement, the centering remains always perfectly accurate, since in no case is play or clearance liable to recur in the bearing in line with the rigid support zones owing to the fact that the load and the elastic force exerted by the pressure-applying means oppose this, and that, moreover, any expansion, which would have a tendency to increase the stress in the rolling elements if all the support regions were rigid, remains, in the arrangement of the invention, within the required limits as to the intensity of this stress, which latter depends only on the intensity of the elastic force or on the possible slight variation in the latter and that of the load (the bearing being of course designed to resist the total stress corresponding to maximum load, if the latter is variable).

The invention could be embodied in different ways derived from that just described, as will be apparent from the ensuing description. Thus, the elastically yieldable pressure-applying means could be dispensed with if one of the races comprises by construction a protrusion in the region where the elastic force for taking up play or for pre-stressing must be applied and if the race having this protrusion is so mounted as to be free in this region to undergo an elastic deformation so that it performs the function of the elastically yieldable pressure-applying means and causes the calibrated pre-stressing of the moving elements in the region of the rigid supports.

Further, without changing the system, the angle subtended at the centre by the two rigid support points could be made zero, in which case the single support region would be located on the radius along which the load is applied.

Figure 2:
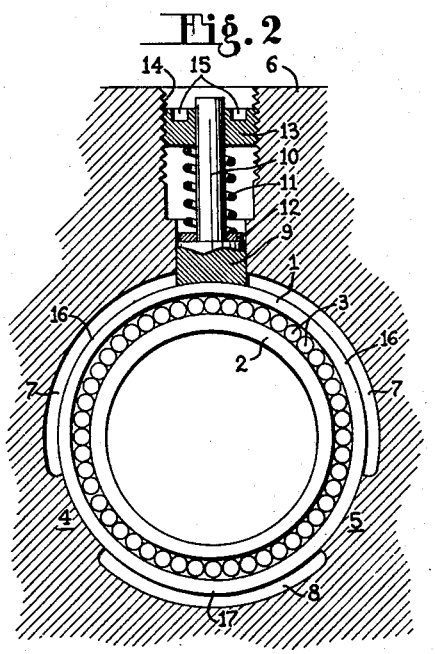
Figure 3:
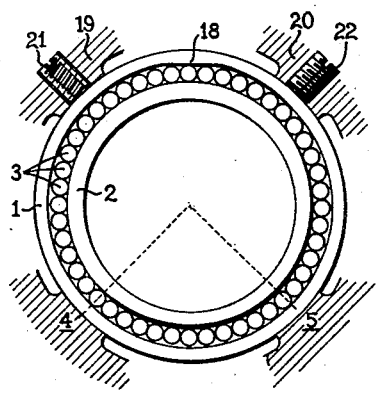
Figure 4:
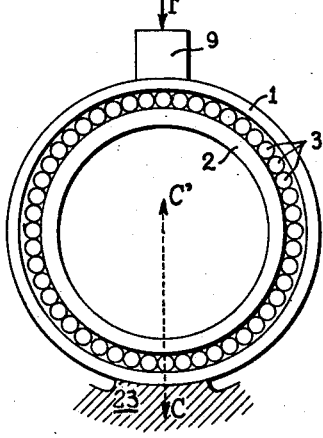

In the accompanying drawings:
FIG. 1 is a diagram of the principle of the invention;
FIG. 2 is an elevational view of a bearing mounted in accordance with one embodiment with an elastically yieldable pressure-applying means;
FIG. 3 is an elevational view of a modification of the invention in which the elastic force is furnished by the spring action of a part of the outer race of the bearing provided with an inner protrusion;
FIG. 4 is an elevational view of a modification of the invention in which the two rigid supports are reduced to a single support;
FIG. 5 is a view similar to FIG. 2 of a bearing in which the outer race comprising outer protrusions is disposed in a circular bore in a housing, the elastically yieldable pressure-applying means having abutments opposing the angular displacement or creep of the outer race.
FIG. 6 is a partial sectional view taken along line 6—6 of FIG. 5;
FIG. 7 is a partial sectional view of a modification of the invention comprising a spring adapted to exert elastic pressure on the outer race;
FIG. 8 is a view similar to FIG. 7 of a modification of the invention;
FIGS. 9 and 10 are views similar to FIG. 7 of modifications of the device preventing displacement or creep of the outer race;

FIG. 11 is a view similar to FIG. 7 of another modification and of a device for temporarily relieving the outer race of the elastic pressure exerted by the spring, the ring being in its deformed condition, and FIG. 12 is a view of the device shown in FIG. 11, in the undeformed condition of the race.

With reference to FIG. 1, the reference numeral 1 designates the outer race or ring, 2 the inner race or ring, and 3 the rolling elements, of an anti-friction bearing, for example a known type of needle bearing. According to the invention, this bearing is disposed within a housing having two inner projections 4 and 5 adapted to perform the function of rigid support zones for the outer race 1, whereas an elastic force F sufficient to deform the race 1 is applied on a third zone of the race. To facilitate assembly and lubrication, the raceways of the bearing in the free state are spaced from each other a radial distance $d$ greater than the diameter $2r$ of the rolling elements 3 by an amount $e=d-2r$, representing the normal clearance or play. This play prevents an accurate centering of the shaft on which the race 2 is mounted. When the bearing is mounted in the housing, the race 1 bears against the projections 4 and 5 and the force F elastically deforms this race, thereby creating a pinching effect or reduction in the distance between the raceways in the region of the supports and of the point at which the force F is applied. This reduction could be such that this distance is equal to the diameter $2r$ or is less than the latter by an amount corresponding to the maximum permissible elastic compression of the rolling elements 3 and/or of the races. A certain pre-determined stress $c$, which is a function of the force F, corresponds to this compression.

In service, added to the stress $c$ is the stress $c'$ due to the load C, which latter is applied within an angle $a$ subtended at the centre of the bearing by the rigid supports 4 and 5 which are judiciously orientated relative to the direction of the load. If the load C is capable of varying between a minimum $C_1$ and a maximum $C_2$ (creating stresses $c_1$ and $c_2$ respectively), the force F is so chosen that the total stress $c_t=c_1+c_2$ is less than the maximum stress $c_m$. The constructor so designs the bearing that it can withstand the stress $c_m$, and the elastic force F is adjusted accordingly, taking into account the load. Thus the user will always be sure that this stress will never be exceeded, notwithstanding the desired accurate centering of the shaft achieved.

FIG. 2 shows an embodiment of the invention in which the projections 4 and 5 consist of part-cylindrical bearing portions 6 separated by recesses 7 and 8. Pressure-applying means 9 is connected to one or more radial rods 10 each of which is surrounded by a spring 11 which bears at one end, through the medium of a washer 12, on the outer face of the pressure-applying means 9 and at the other end against a nut 13 screw-threadedly engaged in a tapped portion 14 of the housing 6 surrounding the spring 11. The nut can be screwed or unscrewed by engaging a key in holes 15. The force F exerted by the spring causes, as explained hereinbefore, a deformation of the race 1, thus eliminating the radial play in the bearing in the region of the rigid supports 4 and 5 and of the pressure-applying means 9 (and even creating a certain pre-stressing), while the race flexes and assumes a smaller radius of curvature owing to its freedom to deform in the regions of the recesses 7 and 8, as shown in an exaggerated manner at 16 and 17, this flexing of the race increasing the radial play in these regions. The nut 13 permits adjusting the compression of the spring 11.

FIG. 3 shows a modification in which the force F, instead of being exerted by spring-stressed pressure-applying means, is produced by the spring action of the race itself. To this end, the race 1 is so machined as to possess a protrusion 18 on its inner raceway and is mounted in a housing provided with rigid supports 19 and 20 disposed on both sides of the protrusion; and the part of the race comprising the latter is flexible and free to undergo an elastic deformation, set up by the reaction of the rollers on protrusion 18 in the restricted annular portion opposite said protrusion. The force F in this embodiment can only be adjusted in varying the angular distance between the supports 19 and 20 (which is mechanically possible).

Two abutment screws 21 and 22 are adapted, when screwed inwardly, to temporarily deform the outer race so as to facilitate, if need be, the assembly of the bearing, these screws being subsequently unscrewed or removed. Other means could, if necessary, be used for this purpose. This temporary deformation of the race, having a protrusion or variations of level in the surface of its raceway, to facilitate or permit assembling the bearing with its opposite race, could be generally applied in particular to all the embodiments described hereinbefore.

In the modification shown in FIG. 4, where the load C is shown to have a substantially invariable direction, the angle subtended at the centre by the rigid supports is reduced to zero, that is, there is only one rigid support 23 situated in the common plane in which the load C and the force F are applied.

A plurality of elastically yieldable means, such as 9 (or like means), could of course be provided, the elastic force F being then the resultant of the elastic forces of the individual pressure-applying means.

Although it is generally much more practical to deform the outer race 1, deformation of the inner race 2 could be contemplated, this being obtained by disposing the rigid supports, such as 4 and 5, and the pressure-applying means or the supports 4, 5, 19, 20 (the protrusion being located on the inner race) between the inner race and the shaft to be centered.

The elastic force F could be provided by other types of mechanical springs (such as Belleville washers, a spring in the form of an annular segment, rubber blocks), or by hydraulic or pneumatic means.

In certain applications, the elastic force F could be applied in the opposite direction to the load, so that it alone determines the maximum primary stress corresponding to bearing operation under normal load, this stress decreasing with increase in the load, without however reaching zero and allowing radial play to re-appear in the region of the supports when the load is maximum (see C' in FIG. 4).

The elastic force F could be made to vary as a function of the load C by making the adjustment of the nut 13 or the like dependent on the flexing of the race 1 in the recesses 7 and 8, thereby decreasing F when C increases, so that the maximum stress is less than a given limit (by means of an easily-conceived mechanical or hydraulic connection), or as a function of the rotational speed of the shaft by putting the adjustment of the nut 13 or the like under the control of a centrifugal governor or the delivery end of a hydraulic or grease pump, or as a function of the temperature reached, for example the heat of the grease.

In a general way, many modifications could be made in the above-described embodiments without departing from the scope of the invention, as defined in the appended claims. Thus, the rigid supports could be associated with one of the races and the elastically yieldable means with the other race, the protrusion being provided either on the outer race or on the inner race. In this case, the elastic deformation of the race applied against the rigid supports occurs through the medium of the anti-friction elements (balls, rollers or needles) which are located at each instant in line with the point of application of the elastic force.

In certain cases, the inner race or ring could be dispensed with, the inner raceway being formed on the shaft, or the outer race could be dispensed with, the outer raceway being formed in the housing surrounding the bearing.

Instead of providing the wall of the bore in the housing 6 with bosses 4 and 5 separated by recesses 7 and 8 as shown in FIG. 2, the outer race 1 could comprise on its periphery bosses 24, 25 and 26 (FIG. 5), the bosses 24 and 25 bearing against the circular wall 26a of the bore of the housing 6, whereas the boss 26 bears against the pressure-applying means 9 biased by the spring 11. In order to control more efficiently the deformations of the outer race, either one of the following arrangements could be advantageously provided.

In FIG. 5 the pressure-applying means 29 is guided with minimum clearance or play in its guide in the housing 6 and includes abutment shoulders 30, 31 engaging on both sides of the boss 26 in the circumferential direction, and abutment shoulders 32, 33 which engage both sides of said boss in the axial direction (FIG. 6).

During bearing operation, the outer race 1 has a tendency to be driven in rotation by the needles 3 in the direction of rotation of the inner race 2. This is no great disadvantage when, as shown in FIG. 2, the outer race is circular, co-operates with fixed bosses and is perfectly elastic, but this displacement of the race 1 must be avoided when, as shown in FIG. 5, the bosses are carried by the race itself, since these bosses participate in the movement of the latter, which modifies the position determined by the constructor for the regions of reduced play and there is even danger of the boss 26 losing contact with the pressure-applying means 9. The abutments 30, 31 oppose this movement or creep.

Further, the distribution of the pressures applied by the pressure-applying means 9 on the race 1 should be symmetrical relative to the plane of FIG. 5, since a dissymmetrical distribution could give rise to a certain warping of the outer race and the needles 3 would be subjected in the region of reduced play to pressures varying from one end to the other of the bearing and this would impair their operation in the direction parallel with the generatrices of a cylinder.

Thus, the pressure-applying means 9 should remain in a constant angular direction relative to the axis 6—6 of its rod 10 which corresponds to the desired contact between its lower face and the periphery of the boss 26. This is obtained by providing the lateral abutments 32, 33 (FIG. 6) which rest against the sides of the boss 26.

It will be understood that these abutments 32, 33 could also be provided in the embodiment shown in FIG. 2 when the outer race has a cylindrical outer surface.

It will also be clear that an abutment 32 or 33 could be provided on only one side of the means 9, if desired. Further, instead of guiding the pressure-applying means by the lateral abutments 32, 33 relative to the race 1, it could be guided relative to the housing, for example by giving the guiding faces for the pressure-applying means a non-circular cross-section by means of a key or any other means.

Thus, the abutments 30, 31, 32, 33 or the like, the accurate guiding of the pressure-applying means 9 in its guide and the shape and dimensions of the surface of contact of the pressure-applying means on the race 1 or its boss 26 permit a precise control of the deformation of the race both in the static state and in service.

This surface of contact could also be machined in such manner that contact occurs over its entire extent, notwithstanding the deformation of the race 1, which is more easily obtained when this race possesses a boss 26, or only at the two ends of the pressure-applying means along two parallel generatrices when the radius of curvature of the periphery of the race 1 varies as a function of the deformation, while that of the inner face of the pressure-applying means is constant.

In order to equally distribute the pressure between these two generatrices and ensure a precise control of the deformation of the race 1 when the radius of curvature of its periphery is affected by the deformation, there could be used with advantage a pressure-applying means consisting of a spring strip of suitable shape which acts in the manner of the beam of a balance.

FIG. 7 shows a spring strip of this kind having a convex portion 35 depressed in its middle at 36 to receive the end of a screw 37—which puts the strip under adjustable tension—and bent-up ends 38 and 39.

Such a device is suitable for anti-friction bearings of small size.

For bearings adapted to withstand heavy loads, it would be impractical to construct a spring having sufficient rigidity for exerting the required pressure by the mere flexing of the convex portion 35.

To increase this rigidity, the ends 38 and 39 and the recess 40 for the spring could be disposed in such manner (FIG. 8) that these ends are wedged against the wall of the recess.

If the angle subtended at the centre by the ends of the zone of contact between the pressure-applying block and the deformable race or the angular distance between the bends in the spring strip, such as 41 or 42 is too small, the ring is liable to become deformed, owing to its natural resilience and under the effect of the load and the rotation, in a dissymetrical manner and cause elimination of clearances where they should exist between the fixed support points and the pressure-applying block or spring, with a corresponding increase in the play on the opposite side. The deformation of the race is so controlled as to render it substantially symmetrical by increasing said subtended angle or angular distance.

To prevent movement or creep of the race 1 when the periphery of the latter is provided with bosses 24, 25, 26, the bends 41, 42 in the spring strip could be used in the manner of circumferential abutments on both sides of the boss 26 (FIG. 9). When the periphery of the race 1 is cylindrical (FIG. 10) the bends 41, 42 could be engaged in recesses 43, 44 formed in the periphery of the race. These recesses could moreover help to render the race more easily deformable.

In order to assemble and disassemble the anti-friction bearing, means have been suggested hereinbefore for temporarily eliminating the deformation of the race 1, for example the screws 19, 20 shown in FIG. 3.

FIG. 5 shows other means consisting in separating the pressure-applying means 9 in opposition to the action of the spring 11, and maintaining it separated by means of a locking device, which could be constructed in various ways, for example by introducing, between the outer wall of the housing 6 and a shoulder 45 on the rod 10, a block such as 46 in the shape of, for example, a hair pin as shown in dot-dash line.

FIGS. 11 and 12 show another pressure-releasing device applicable to the spring shown in FIG. 10 and constituted by a non-circular rotary cam 47 which bears against the recess 36 in the spring. In the position shown in FIG. 11, the large dimension of the cam is positioned radially and the spring is under tension, and in the position shown in FIG. 12, the small dimension of the cam is directed radially and the tension of the spring is reduced or eliminated.

Although specific embodiments of the invention have been described, many modifications and changes may be made therein without departing from the scope of the invention as defined in the appended claims.

Having now described my invention what I claim as new and desire to secure by Letters Patent is:

1. In combination with a stationary structure and a rotary structure, an anti-friction bearing comprising a first raceway provided on one of said structures, a ring having a second raceway coaxial with said first raceway, a circular row of rolling members disposed between said raceways, rigid support means provided between said ring and the other of said structures for supporting a peripheral portion of said ring, the angular extent of which is less than 180° and at least equal to the maximum amplitude of the variations in the angular direction of the radial load transmitted to the bearing, and pressure means adapted to exert a radial elastic pressure on said ring to elastically deform the latter and eliminate any radial clearance between regions of said raceways and said rolling members opposite said support means and said pressure means, whereby accurate centering of said rotary structure is maintained while the stress in said rolling members in service does not exceed a maximum value depending on the value of said radial pressure and the maximum value of said load.

2. In combination with a stationary structure and a rotary structure, an anti-friction bearing comprising a first raceway provided on one of said structures, a ring having a second raceway coaxial with said first raceway, a circular row of rolling members disposed between said raceways, a local rigid projection on the wall of the other of said structures engaging said ring, said projection having such peripheral extent as to subtend an angle at the axis of said raceways which is less than 180° and at least equal to the maximum amplitude of the variations in the angular direction of the radial load transmitted to the bearing, and pressure means adapted to exert a radial elastic pressure on said ring to elastically deform the latter and eliminate any radial clearance between regions of said raceways and said rolling members opposite said projection and said pressure means, whereby accurate centering of said rotary structure is maintained while the stress in said rolling members in service does not exceed a maximum value depending on the value of said radial pressure and the maximum value of said load.

3. In combination with a stationary structure and a rotary structure, an anti-friction bearing comprising a first raceway provided on one of said structures, a ring having a second raceway coaxial with said first raceway, a circular row of rolling members disposed between said raceways, two local rigid projections on the wall of the other of said structures, engaging said ring, and pressure means adapted to exert a radial elastic pressure on said ring to elastically deform the latter and eliminate any radial clearance between regions of said raceways and said rolling members opposite said projections and said pressure means, whereby accurate centering of said rotary structure is maintained while the stress in said rolling members in service does not exceed a maximum value depending on the value of said radial pressure and the maximum value of said load.

4. In combination with a stationary structure and a rotary structure, an anti-friction bearing comprising a first raceway provided on one of said structures, a ring having a second raceway coaxial with said first raceway, a circular row of rolling members disposed between said raceways, two local rigid projections on said ring engaging the other of said structures, and pressure means adapted to exert a radial elastic pressure on said ring to elastically deform the latter and eliminate any radial clearance between regions of said raceways and said rolling members opposite said projections and said pressure means, whereby accurate centering of said rotary structure is maintained while the stress in said rolling members in service does not exceed a maximum value depending on the value of said radial pressure and the maximum value of said load.

5. In combination with a stationary structure and a rotary structure, an anti-friction bearing comprising a first raceway provided on said rotary structures, a ring having a second raceway coaxial with said first raceway, a circular row of rolling members disposed between said raceways, rigid support means provided between said ring and said stationary structure, through the medium of which support means a peripheral portion of said ring is locally supported at at least the ends of said portion by said stationary structure, said portion having such peripheral extent as to subtend an angle at the axis of said raceways which is less than 180° and at least equal to the maximum amplitude of the variations in the angular direction of the radial load transmitted to the bearing, and pressure means associated with said stationary structure and adapted to exert a radial elastic pressure on said ring to elastically deform the latter and eliminate any radial clearance between regions of said raceways and said rolling members opposite said support means and said pressure means, whereby accurate centering of said rotary structure is maintained while the stress in said rolling members in service does not exceed a maximum value depending on the value of said radial pressure and the maximum of said load.

6. In combination with a stationary structure and a rotary structure, an anti-friction bearing comprising a first circular raceway provided on one of said structures, a ring having a second raceway which is generally coaxial with said first raceway and has an inwardly projecting portion, a circular row of rolling members disposed between said raceways, rigid means interposed between the other of said structures and said ring, adjacent to and on either side of said inwardly projecting portion, whereby said ring has no contact with said other structure between said means and is free to undergo elastic radial deformation, rigid support means interposed between the other of said structures and said ring opposite said inwardly projecting portion and through which the radial load of said rotary structure is transmitted to said stationary structure, the height of said projecting portion being such that said ring is elastically deformed by contact with said rolling members and eliminates any radial clearance between regions of said raceways and said rolling members opposite said support means and the inwardly projecting portion.

7. The combination claimed in claim 1, wherein said pressure means is adapted to exert a radial elastic pressure on said ring in a direction opposite the radial direction of the load and has a magnitude greater than the maximum magnitude of the load.

8. The combination claimed in claim 6, further comprising means for temporarily deforming said ring to counteract the action of said inwardly projecting portion for assembling and disassembling said bearing.

9. In combination with a stationary structure and a rotary structure, an anti-friction bearing comprising a first raceway provided on said rotary structure, a ring having a second raceway coaxial with said first raceway, a circular row of rolling members disposed between said raceways, rigid support means provided between said ring and said stationary structure through the medium of which support means a peripheral portion of said ring is locally supported at at least the ends of said portion by said stationary structure, said portion having such peripheral extent as to subtend an angle at the axis of said raceways which is less than 180° and at least equal to the maximum amplitude of the variations in the angular direction of the radial load transmitted to the bearing, a spring biased pressure member carried by said stationary structure and adapted to exert a radial elastic pressure on said ring to elastically deform the latter and eliminate any radial clearance between regions of said raceways and said rolling members opposite said support means, whereby accurate centering of said rotary structure is maintained while the stress in said rolling members in service does not exceed a maximum value depending on the value of said radial pressure and the maximum value of said load.

10. The combination claimed in claim 9, further comprising guiding means associated with said pressure member and engaging radial surfaces on said ring to accurately position said pressure member relative to said ring.

11. The combination claimed in claim 9, further comprising an outer projection on said ring opposite said pressure member and locking means associated with said pressure member and engaging said outer projection to prevent rotational displacement of said ring relative to said pressure member.

12. In combination with a stationary structure and a rotary structure, an anti-friction bearing comprising a first raceway provided on said rotary structure, a ring having a second raceway coaxial with said first raceway, a circular row of rolling members disposed between said raceways, rigid support means provided between said ring and said stationary structure through the medium of which support means a peripheral portion of said ring is locally supported at at least the ends of said portion by said stationary structure, said portion having such peripheral extent as to subtend an angle at the axis of said raceways which is less than 180° and at least equal to the maximum amplitude of the variations in the angular direction of the radial load transmitted to the bearing, a recess in said stationary structure, a spring strip arranged in said recess and having a middle concave portion and two legs and an element supported by said stationary structure and engaging said middle concave portion, whereby said legs are pressed against said ring and are adapted to exert there on a radial elastic pressure to elastically deform the latter and eliminate any radial clearance between regions of said raceways and said rolling members opposite said support means, whereby accurate centering of said rotary structure is maintained while the stress on said rolling members in service does not exceed a maximum value depending on the value of said radial pressure and the maximum value of said load.

13. The combination claimed in claim 12, wherein said element is an adjustable screw screwed in said stationary structure.

14. The combination claimed in claim 12, wherein said legs are bent outwardly, the ends of said bent portions being adapted to engage the wall of said recess and increase the rigidity of said spring strip.

15. The combination claimed in claim 12, further comprising an outer projection on said ring opposite said spring strip, said legs engaging the ends of said projection to prevent rotational displacement of said ring.

16. The combination claimed in claim 12, wherein said ring has two recesses respectively engaged by the legs of said spring strip to prevent rotational displacement of said ring.

17. The combination claimed in claim 12, wherein said element is a rotary cam member, which can be moved from a normal operative position, wherein said spring strip is forced against said ring to an inoperative position wherein the pressure exerted by said spring strip on said ring is decreased, for assembling and disassembling purposes.

18. The combination claimed in claim 1, comprising means for temporarily counteracting the action of said pressure means on said ring, for assembling and disassembling purposes.

References Cited in the file of this patent

UNITED STATES PATENTS

| | | |
|---|---|---|
| 977,655 | Kunkel | Dec. 6, 1910 |
| 1,972,581 | Barker | Sept. 4, 1934 |
| 2,913,859 | Koch | Nov. 24, 1959 |

FOREIGN PATENTS

| | | |
|---|---|---|
| 161,911 | Great Britain | Apr. 21, 1921 |
| 269,867 | Great Britain | Sept. 15, 1927 |
| 837,249 | France | Nov. 3, 1938 |
| 1,079,848 | France | May 26, 1954 |
| 763,703 | Great Britain | Dec. 12, 1956 |